United States Patent Office 2,820,738
Patented Jan. 21, 1958

2,820,738

SUBSTITUTED 2-PHENYL-INDAN-1.3-DIONE

Franz Litvan and Willy Stoll, Basel, Switzerland, assignors, by mesne assignments, to Geigy Chemical Corporation, New York, N. Y., a corporation of Delaware No Drawing. Application March 22, 1954
Serial No. 417,933

Claims priority, application Switzerland April 30, 1953

3 Claims. (Cl. 167—65)

2-phenyl indan-1.3-dione has been accepted by the medical profession as an anticoagulant for oral administration. The substance reduces the prothrombin level in the blood and its action is relatively short so that as a result, its effect can be controlled easily.

2-acyl indan-1.3-diones such as, e. g. 2-pivalyl indan-1.3-dione and in particular, 2-diphenylacetyl indan-1.3-dione are effective in considerably lower doses than 2-phenyl indan-1.3-dione, but their effect lasts longer and so they cannot be adapted so easily to the therapeutical requirements and condition of the patient.

It has now been found that the new compound 2-(p-chlorophenyl)-indan-1.3-dione is active in considerably smaller doses than 2-phenyl indan-1.3-dione whilst the duration of its action is no longer than that of the latter compound. The use of 2-(p-chlorophenyl)-indan-1.3-dione thus enables a considerable reduction in dosage to be made without a longer lasting and more difficultly controllable reduction of the prothrombin level having to be taken into consideration which is otherwise generally the case with highly active compounds not only of the 2-substituted indan-1.3-diones but also with derivatives of 4-hydroxycoumarin.

According to the solvent, the new compound crystallises in dark red or in pale yellowish needles which melt at 145–146°. It can be produced by various methods. Phthalic acid anhydride and p-chlorophenyl acetic acid can be condensed by means of molten sodium acetate according to the method for the non-chlorinated compound described by S. Gabriel, B. 18, 3470, and the p-chlorobenzalphthalide so obtained can be converted by means of an alkali alcoholate into 2-(p-chlorophenyl)-indan-1.3-dione in an analogous manner to that which F. Nathanson, B. 26, 2576 (1893) describes for the 2-phenyl indan-1.3-dione.

Lower phthalic acid dialkyl esters can be condensed by means of sodium in benzene hydrocarbons or by means of alkali alcoholates with p-chlorophenyl acetic acid alkyl esters to form 2-carbalkoxy-2-(p-chlorophenyl)-indan-1.3-diones which latter compounds are converted by acid saponification and decarboxylation into the desired 2-(p-chlorophenyl)-indan-1.3-dione.

Further the following methods described for the production of 2-phenyl indan 1.3-dione can be used for the production of the new compound: a lower 2-(p-chlorophenylacetyl)-benzoic acid alkyl ester can be converted into 2-(p-chlorophenyl)-indan-1.3-dione by reaction with an alkali alcoholate, see F. Nathanson, B. 26, 2578 (1893). The new compound can be obtained direct, probably over p-chlorobenzal phthalide as intermediate product which cannot be isolated, by condensation of phthalide and p-chlorobenzaldehyde by means of an alkali alcoholate. (See W. Dieckmann, B. 47, 1439 (1914).)

The following example serves to illustrate more closely the production of the new compound. Parts are given as parts by weight and the relationship of parts by weight to parts by volume is as that of grammes to cubic centimetres. The temperatures are given in degrees centigrade.

*Example*

41 parts of phthalic acid anhydride, 56 parts of p-chlorophenyl acetic acid and 2 parts of molten sodium acetate are heated for 4 hours at 240° inner temperature and the water which is found is distilled off by means of a cooler. The red-brown reaction product is allowed to cool to about 90°, dissolved by heating in alcohol, and the solution, which is filtered hot, is cooled. After filtering under suction and washing with alcohol, 42 parts of p-chlorobenzal phthalide are obtained. M. P. 152–153°.

This compound is suspended in 500 parts by volume of abs. methanol at boiling temperature and a solution of 4 parts of sodium in about 50 parts by volume of abs. methanol is added dropwise. The methanol is removed from the dark red solution by distillation on the water bath and the residue is dissolved in water. 2-(p-chlorophenyl)-indan-1.3-dione is precipitated by the addition of acid to the filtered solution. It is obtained in its dark red form. On crystallising from alcohol dark red needles, and on crystallising from dilute acetic acid, pale yellowish needles are obtained. M. P. 145–146°.

The new compound prepared according to the invention may be made into pharmaceutical compositions by admixture thereof with suitable and compatible pharmaceutical carriers.

Those pharmaceutical compositions are of special importance which are in the form of capsules, powders, tablets, or any other form which is suitable for administration per os. The compositions may be obtained by admixing the active ingredient, i. e. the new 2-(p-chlorophenyl)-indan-1.3-dione with pharmaceutical carriers such as cornstarch, lactose, stearic acid, talc, magnesium stearate, etc. One dosage unit may contain 5 to 20 mg. of 2-(p-chlorophenyl)-indan-1.3-dione, and preferably about 10 mg.

What we claim is:
1. 2-(p-chlorophenyl)-indan-1.3-dione.
2. A pharmaceutical composition comprising 2-(p-chlorophenyl)-indan-1.3-dione and a pharmaceutical carrier therefor.
3. A pharmaceutical composition comprising 2-(p-chlorophenyl)-indan-1.3-dione in a sufficient quantity to lower the prothrombin level in the blood and a pharmaceutical carrier therefor.

References Cited in the file of this patent

UNITED STATES PATENTS 2,672,483   Thomas _____ Mar. 16, 1954

OTHER REFERENCES

Koelsch, J. Am. Chem. Soc. 58, 1329 (1936).
Burger, A., Medicinal Chemistry, vol. 1, p. 264, 1951.